US010769381B2

(12) United States Patent
Tacchi et al.

(10) Patent No.: US 10,769,381 B2
(45) Date of Patent: *Sep. 8, 2020

(54) TOPIC-INFLUENCED DOCUMENT RELATIONSHIP GRAPHS

(71) Applicant: Quid, Inc., San Francisco, CA (US)

(72) Inventors: Ruggero Altair Tacchi, San Francisco, CA (US); Fabio Ciulla, San Francisco, CA (US); Wojciech Musial, San Francisco, CA (US); Robert Goodson, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/629,001

(22) Filed: Jun. 21, 2017

(65) Prior Publication Data

US 2018/0173699 A1 Jun. 21, 2018

Related U.S. Application Data

(63) Continuation of application No. 15/379,724, filed on Dec. 15, 2016, now Pat. No. 9,715,495.

(51) Int. Cl.
*G06F 16/27* (2019.01)
*G06F 16/30* (2019.01)
*G06F 40/30* (2020.01)
*G06F 16/35* (2019.01)
*G06F 16/901* (2019.01)

(52) U.S. Cl.
CPC ............ *G06F 40/30* (2020.01); *G06F 16/358* (2019.01); *G06F 16/9024* (2019.01)

(58) Field of Classification Search
CPC ........... G06F 17/2785; G06F 17/30713; G06F 17/30958; G06F 40/30; G06F 16/358
USPC ........................................................ 707/738
See application file for complete search history.

(56) References Cited

U.S. PATENT DOCUMENTS

| 8,515,957 B2* | 8/2013 | Knight ............. G06F 17/30713 707/737 |
| 9,483,580 B2* | 11/2016 | Franceschini ..... G06F 17/30958 |
| 2013/0246430 A1* | 9/2013 | Szucs ................ G06F 17/30011 707/738 |
| 2016/0132789 A1* | 5/2016 | Flinn .................... G06F 17/271 706/14 |

(Continued)

*Primary Examiner* — Kuen S Lu
(74) *Attorney, Agent, or Firm* — Pillsbury Winthrop Shaw Pittman, LLP

(57) ABSTRACT

Provided is a process of enhancing or suppressing measures of relationships between documents based on the relationships arising from text pertaining to selected topics, the process including: obtaining a corpus of documents; obtaining a set of topics by self-extracting topics according to the tokens present in text of the documents or manual provision; receiving a selected topic among the set of topics, the selection indicating that relationships between the documents are to be enhanced or suppressed in virtue of the relationships arising from text relating to the selected topic; forming a relationship graph of the documents, wherein: the relationships between pairs of the documents are determined based on co-occurrence of n-grams in the pairs of the documents, and wherein the relationships are enhanced or suppressed in response to co-occurring n-grams being in the respective set of n-grams of the selected topic.

38 Claims, 3 Drawing Sheets

(56) References Cited

U.S. PATENT DOCUMENTS

2016/0147891 A1* 5/2016 Chhichhia ......... G06F 17/30011
  707/734
2016/0232157 A1* 8/2016 Mansour ........... G06F 17/30011

* cited by examiner

US 10,769,381 B2

TOPIC-INFLUENCED DOCUMENT RELATIONSHIP GRAPHS

CROSS-REFERENCE TO RELATED APPLICATIONS

The present patent is a continuation of U.S. patent application Ser. No. 15/379,724, filed 15 Dec. 2016, titled TOPIC-INFLUENCED DOCUMENT RELATIONSHIP GRAPHS, the contents of which are hereby incorporated by reference in its entirety.

BACKGROUND

1. Field

The present disclosure relates generally to computational linguistics and, more specifically, to techniques for forming topic-influenced document relationship graphs.

2. Description of the Related Art

Often people wish to draw inferences based on information contained in, and distributed among, relatively large collections of documents, e.g., substantially more documents than they have time to read or the cognitive capacity to analyze. Certain types of inferences implicate relationships between those documents. For example, it may be useful to organize documents by the subject matter described in the documents, sentiments expressed in the documents, or topics addressed in the documents. In many cases, useful insights can be derived from such organization, for example, discovering taxonomies, ontologies, relationships, or trends that emerge from the analysis. Examples might include organizing restaurants based on restaurant reviews, organizing companies based on content in company websites, organizing current events or public figures based on new stories, and organizing movies based on dialogue.

One family of techniques for making such inferences is computational linguistic analysis of text, such as unstructured text, within the documents of a corpus, e.g., with natural language processing techniques, like those based on distributional semantics. Computers are often used to perform semantic similarity analyses within corpora to gauge document pair-wise similarity of the documents according to various metrics, or pair-wise measures of relationships between entities, topics, terms, or sentiments discussed in the documents, which may be crafted to yield results like those described above. Through the sophisticated use of computers, inferences that would otherwise be impractical are potentially attainable, even on relatively large collections of documents.

SUMMARY

The following is a non-exhaustive listing of some aspects of the present techniques. These and other aspects are described in the following disclosure.

Some aspects include a process of enhancing or suppressing measures of relationships between documents based on the relationships arising from text pertaining to selected topics, the process including: obtaining a corpus of documents; obtaining a set of topics; receiving a selected topic among the set of topics, the selection indicating that relationships between the documents are to be enhanced or suppressed in virtue of the relationships arising from text relating to the selected topic; forming a relationship graph of the documents, wherein: the relationships between pairs of the documents are determined based on co-occurrence of n-grams in the pairs of the documents, and wherein the relationships are enhanced or suppressed in response to co-occurring n-grams being in the respective set of n-grams of the selected topic.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
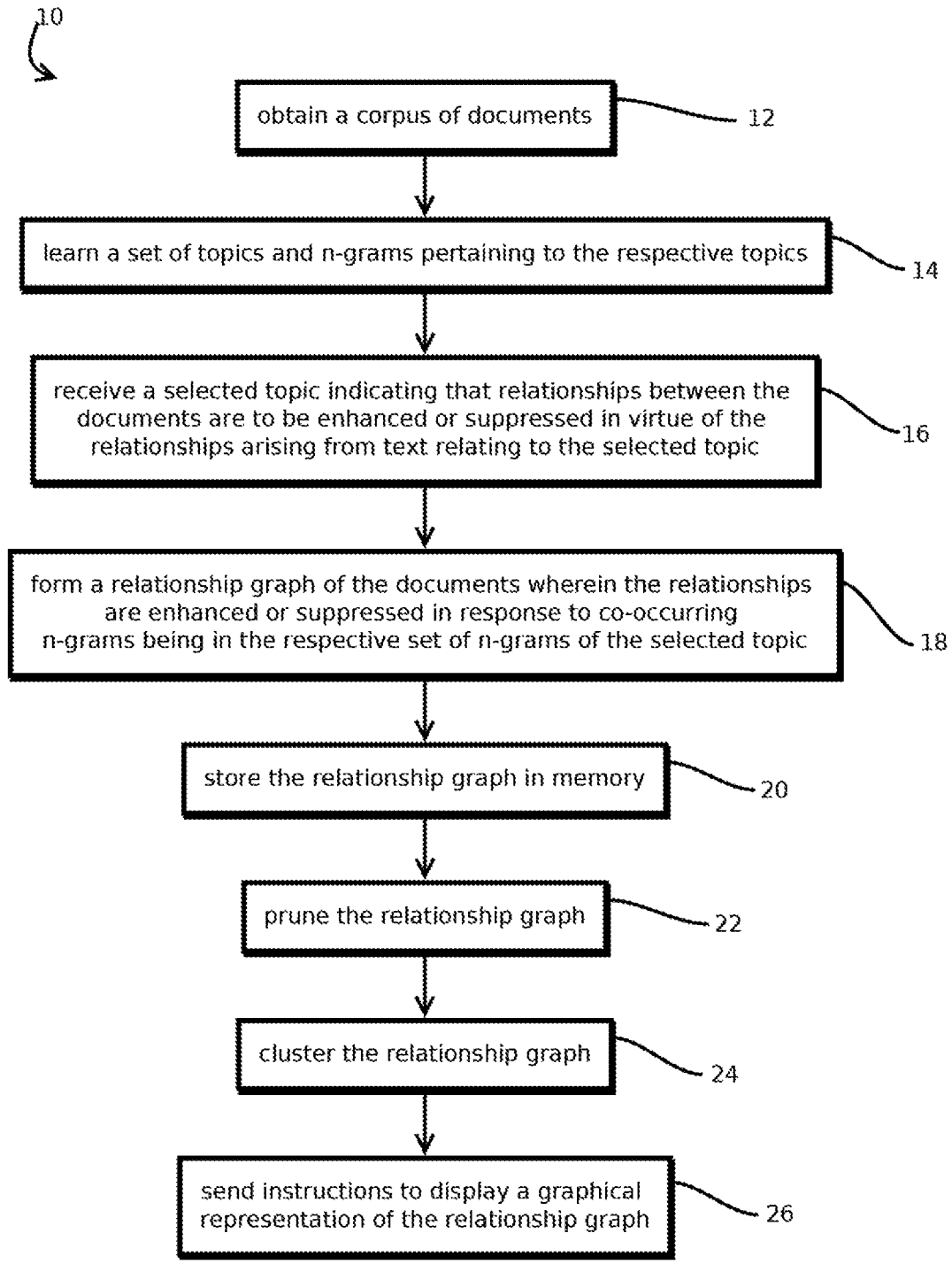
FIG. 1 is a flowchart of an example of a process to form a topic-influenced document-relationship graph.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of computational linguistics. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Often, relationship graphs between documents over or under emphasize certain relationships, particularly when viewed by those with domain expertise. For instance, an analyst interested in the technical evolution of the electric car market might submit a corpus of news articles pertaining to electric cars to a computational linguistics system, and the system may return a clustered semantic similarity graph indicating clusters of semantically related documents. In some cases, a particular newsworthy, but substantively irrelevant for the analyst's purposes, event may drive the result more than is desirable. Examples include a noteworthy crash of an electric car driven by a celebrity and generating a large number of news stories that may overwhelm more interesting relationships to the analyst. Generally, traditional systems do not provide an effective, computationally tractable, user-friendly mechanism to adjust the relationship graph to mitigate these effects.

Some embodiments may mitigate some, and in some cases all, of these issues and others by forming document relationship graphs in view of topics to be enhanced or suppressed. Relationships driven by topics to be enhanced, e.g., resulting from the specified topic being discussed in two documents, may be up-weighted or otherwise increased in strength, and vice versa for topics to be suppressed. Some embodiments may ingest user-supplied topics and related data, or some embodiments may learn topic-related data (or topics and topic-related data) with supervised or unsupervised learning techniques. Further, some embodiments may do so with techniques that are relatively computationally efficient and reduce relatively slow movement of data up and down the memory hierarchy of computer systems or between a distributed set of computer systems in a compute cluster.

Some embodiments may execute a process 10 shown in FIG. 1 to enhance or suppress the effect of various topics on document relationship graphs. In some embodiments, a set of topics may be identified for a corpus of documents, for instance, an explicitly defined user-specified set of topics, a set of topics learned with an unsupervised learning model (e.g., from the corpus of documents), or a set of topics learned from a supervised learning model (e.g., from a training set of documents bearing topic-labeled unstructured text). In some embodiments, a user may select among these topics, and terms in the text of the documents that pertain to the selected topic may be processed differently when forming the document relationship graph. For example, when a relationship arises from a keyword pertaining to a topic, the effect of that keyword in defining the relationship may be enhanced or suppressed in response, thereby increasing or decreasing the significance of the topic in assessing relationships between the documents.

In some embodiments, the steps of process 10 may be performed in a different order from the order recited, and some embodiments may include instructions for performing the steps of process 10 encoded on a machine-readable non-transitory medium. In some embodiments, some of the steps of the process 10 may be performed concurrently on a relatively large number of different computing nodes in a compute cluster, for example, more than 10 different computing devices each processing a subset of the documents or topics, to expedite operations, or in some embodiments, each of the steps may be performed on a single computing device. Examples of computing devices by which the present techniques may be implemented are described below with reference to FIG. 3, and an example of a computational linguistics system that may perform process 10 when generating document relationship graphs is described below with reference to FIG. 2.

As shown in FIG. 1, some embodiments of the process 10 may include obtaining a corpus of documents, as indicated by block 12. In some embodiments, the corpus may be relatively large, for example, including more than 1,000, more than 5,000, more than 10,000, and in many cases more than 100,000 or more than 1 million documents. In some embodiments, each of the documents may include unstructured natural language text from which relationships are inferred between the documents. In some embodiments, the documents may have on average more than 139 characters, more than 100 words, more than 500 words, and in many cases more than 1,000 or more than 5,000 words of unstructured text. In some embodiments, the documents may also include structured text, such as metadata identifying a network address of the document, an author of the document, a date of the document, a publisher of the document, or the like.

Documents may come from a variety of different sources, including online documents, like webpages or documents hosted in an application-program interface (API) accessible document databases. In some embodiments, the documents are from a particular genre or a particular type of publisher, such as academic journals, like scientific journals, medical journals, or law journals. In some embodiments, the documents are new stories, such as Associated Press articles, for instance, within some range of time and pertaining to some industry. In some embodiments, the documents are from government filing, such as Securities and Exchange Commission filings, Federal Communication Commission filings, or patent filings. In some embodiments, the corpus comes from a single one of these sources, or some embodiments may include documents from multiple instances of the above sources. In some embodiments, the documents are internal proprietary documents of a company, such as email within an organization, customer feedback on products, employee notes and a customer relationship management system, and the like. In some cases, the obtained corpus of documents may be documents encoded in a text file format for relatively fast access and manipulation, such as Unicode or ASCII.

In some embodiments, each document corresponds to a distinct publication at a particular time range. Or in other cases, each document corresponds to a subset of such a publication, such as a paragraph, chapter, or other unit of text analyzed as a unit for purposes of measuring relationships between other such units of text. For instance, user reviews of restaurants may each be treated as a distinct document when multiple reviews are parsed from a single webpage.

Some embodiments of the process 10 includes learning a set of topics and n-grams pertaining to the respective topics, as indicated by block 14. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained in step 12, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system described below with reference to FIG. 2 with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

In some examples, the probability of the topics may be 1) the conditional probability of the respective topic being exhibited given the respective document multiplied by 2) the conditional probability of the respective n-gram occurring given that the respective topic is exhibited (as indicated by the current distribution of assignments). In other examples, the probabilities of the topics may be based on other combinations of these quantities. In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing in the process of FIG. 1.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics.

In some cases, identifiers of the topics may be sent to a remote computing device, for instance, in the form of instructions to render a webpage of a graphical user interface in a client-side web browser, sent from the system described below with reference to FIG. 2. In some embodiments, those instructions may include an event handler and inputs by which a user selects among the topics. In some embodiments, the user interface may include both an input to select topics and an input to select an amount of enhancement or suppression associated with the topic or to indicate a binary value indicating whether the corresponding topic is to be enhanced or suppressed. For instance, some embodiments may include radio buttons to indicate enhancement or suppression as a binary phenomenon or sliders (or dials) that a user may adjust to indicate an amount of enhancement or suppression, for instance, with an input analogous to a graphic equalizer or mixing board as is used in audio equipment. In some embodiments, a cross-device session may be established, with user-interface controls on one device, like a tablet computer, and results displayed on another device, like a laptop or desktop web browser.

In some embodiments, topics may be self-extracted according to tokens present in the text. For instance, if many drug names are mentioned, then a topic of "healthcare" may emerge, or if many ingredients or dishes are mentioned, then a topic of "food" may emerge. Some embodiments may determine whether user supplied topics are to be used or topics are to be extracted. In response to determining that topics are to be extracted, some embodiments may execute the above-described techniques for topic extraction. In response to determining that user-supplied topics are to be used, some embodiments may proceed with those topics. In some cases, a mix of user-supplied and extracted topics may be used.

In some cases, the user selection may be sent back to the system described below with reference to FIG. 2, and some embodiments may receive a selected topic indicating that relationships between the documents of the corpus are to be enhanced or suppressed in virtue of the relationships arising from text relating to the selected topic, as indicated by block 16. The effect of the suppression or enhancement may depend on an amount indicated associated with the receive selection, and in some embodiments, the user may submit a selection of a single topic or a plurality of topics and corresponding suppression or enhancement amounts. In some cases, multiple topics may be selected, with a plurality of topics selected for enhancement and different plurality of topics selected for suppression.

In some embodiments, the topics may be selected implicitly. For example, the user may be sent a clustered document relationship graph, and a user may select the cluster indicating a desire to break up the cluster. Some embodiments may infer topics contributing to the cluster, such as identifying a dominant topic of documents within the cluster, and that topic may be selected as a topic to be suppressed. Similarly, in some cases, a user may select a plurality of clusters to be joined (e.g., by drawing a free-hand circle on a touchscreen around the clusters), and a dominant topic among the plurality of clusters may be determined and selected as a topic to be enhanced.

Next, some embodiments may form a relationship graph of the documents of the corpus, wherein the relationships are enhanced or suppressed in response to co-occurring n-grams being in the respective set of n-grams of the selected topic, as indicated by block 18. A variety of techniques may be used to influence the formation of the relationship graph based on the selected topic and keywords pertaining to that topic. In some embodiments, the relationship graph is based on similarities between document feature vectors, where dimensions of the vectors correspond to n-grams of the corpus. Some embodiments may adjust the magnitude of the vectors in dimensions corresponding to the n-grams pertaining to the selected topic.

For example, the corpus may include 10,000 unique n-grams (or other amounts, for instance, more than 1,000, more than 5,000, more than 10,000, or more than 50,000), and each document may have an associated document feature vector with 10,000 (or a corresponding number of) dimensions, each dimension quantified with a cardinal value indicating an amount (e.g., count, frequency, or document-set normalized frequency) of occurrences of the corresponding n-gram in the respective document. For example, the n-gram noted above "quick brown fox" may correspond to the 578th dimension of document feature vectors of the documents, and documents that do not include this n-gram may have a value of zero for this dimension, documents including this n-gram once may have a nonzero value, and documents including this n-gram multiple times may have an even larger value. In some cases, the value may be suppressed based on how unique the n-gram is to the document relative to the set of documents.

In some cases, the values indicating an amount of occurrences of n-grams and each of the document feature vectors may be based on both an amount of times that the corresponding n-gram appears within the document and an amount of time the corresponding a n-gram appears within a plurality of other documents, such as a statistically representative sample of the corpus or the entire corpus. In some embodiments, the value may be a term frequency inverse document frequency (TF-IDF) score like that described below. In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

In some embodiments, the document feature vectors may be adjusted based on the topic, for instance, by combining the document feature vectors with the topic vectors. In some embodiments, the dimensions of these two vectors may match, such that the same n-gram in each vector corresponds to the same dimension (e.g., the same position in a tuple). In some embodiments, the topic vectors may have binary values of zero and one indicating whether corresponding n-grams are predictive beyond some threshold of the corresponding topic being exhibited. In some embodiments, these binary vectors may be multiplied by a scaling coefficient corresponding to an amount of suppression or enhancement. For instance, in response to a user indicating that a particular topic is to be enhanced by 10%, such vectors may be multiplied by 1.1 (or one plus the percentage). Each dimension of the resulting topic vector having a nonzero value may then be multiplied by a corresponding dimension of the document feature vector, thereby increasing the values for the n-gram's corresponding to the selected topic in the document feature vector. In another example, where a topic is to be suppressed, and topic vectors are Boolean, the user may indicate that a particular topic is to be suppressed by 30%, and the topic vector may be multiplied by a scaling coefficient of one minus the user supplied amount, or 0.7. This scaled topic vector may then be combined with the document feature vectors using a similar technique. In some cases, this combination may be performed for a given topic for each of the document feature vectors.

In another example, the topic vectors dimensions expressed as real numbers, for instance, values ranging from zero through one at increments of 0.01. In some embodiments, each dimension of the topic vector may be shifted, for instance by adding 0.5, to make dimensions corresponding to n-grams more than some threshold predictive of the topic have a value greater than one and other n-grams have a value less than one, such as those that are not particularly predictive of the topic. In some embodiments, the shifted dimensions may be rescaled, for instance, based on a magnitude of enhancement or suppression supplied by a user by multiplying the shifted dimensions by some corresponding scaling coefficient. Then the resulting shifted, scaled topic vector may be combined with the document feature vectors using techniques like those described above. In some embodiments, values of the shifted, scaled topic vector less than some threshold, for instance one, may be adjusted to have a value of one such that terms un-predictive of the selected topic remain unaffected. In some embodiments, the shifted topic vector values may be scaled nonlinearly, for instance by calculating an exponential value of the dimensions, like squaring or cubing to magnify the effect of highly correlated and predictive n-grams. In cases where such a real-number topic vector is to suppress the topic, the topic vector dimensions may be transformed by multiplying the dimension values by minus one and then adding the result to one, making a dimension value of 0.9 (a predictive n-gram) become 0.1, and a dimension value of 0.2 (an un-predictive n-gram) be 0.8. Then similar techniques like those described above may be applied, in some cases, setting values greater than some threshold, like one, equal to one.

Thus, some embodiments may yield transformed document feature vectors where dimensions of the document feature vectors corresponding to n-grams predictive of the selected topic are increased or decreased depending upon whether the selected topic is to be enhanced or suppressed.

Next, a relationship graph may be formed based on similarities between the transformed document feature vectors. For example, some embodiments may calculate an adjacency matrix, such as a square symmetric matrix where a first dimension corresponds to each of the documents in the corpus and a second dimension also corresponds to each of the documents in the corpus, and values in the adjacency matrix indicate an amount of a relationship (like semantic similarity, similar sentiment, etc.) between the corresponding documents. In some cases, the values of the adjacency matrix may be based on an angle, such as a cosine of an angle of the document feature vectors of the document correspond to the row and the document corresponding to the column of the value.

In some cases, transforming particular dimensions of the document feature vectors to have larger or smaller values increases the effect of those dimensions on the relative angles (and other measures of similarity) between document feature vectors. For instance, if a particular n-gram co-occurs in two documents, and that n-gram is highly predictive of a topic selected for strong enhancement, then the dimension of the corresponding document feature vectors may be increased, and the two documents may be deemed to be even more similar in virtue of that n-gram co-occurring in the two documents than would otherwise be the case. Similarly, if a particular n-gram occurs in two documents, and that n-gram is highly predictive of a topic selected for strong suppression, then the dimension of the corresponding document vectors may be decreased, and the two documents may be deemed to be less similar (or more weakly related) than would otherwise be the case due to that n-gram co-occurring in the two documents.

Other examples of techniques for forming document relationship graphs are described below with reference to FIG. 2, and the above-described adjustments to document feature vectors may be implemented in conjunction with those other techniques.

In some embodiments, the document relationship graphs may be formed in advance of receiving the selected topic. In some cases, forming document relationship graphs may be relatively slow compared to a user's expectations for responsiveness of applications. Some embodiments may pre-calculate relationship graphs for each of the set of topics, and upon receiving a selection of a topic, select the corresponding relationship graph from among the pre-calculated relationship graphs to provide a response to the user relatively quickly.

In some embodiments, the relationship graphs may be pre-calculated for each individual topic, but a user may select multiple topics. In response, some embodiments may combine corresponding pre-calculated relationship graphs, for instance, by averaging corresponding values of the relationship graphs (e.g., the value in row 3, column 4, of each of the graphs may be combined in an average value, and so on for each of the values). In some cases, a user may select multiple topics, with some topics designated for suppression and other topics designated for enhancement, and a relationship graph may be pre-calculated for each topic and for each type of instruction for that topic, with the corresponding pre-calculated adjacency matrices being combined, for instance, as an average on a corresponding value by corresponding value basis, or based on some other measure of central tendency of corresponding matrix values.

Some embodiments may store the relationship graph in memory, as indicated by block 20. In some cases, storing the relationship graph in memory may include storing the graph in nonvolatile memory, for instance, on a solid-state drive or hard disk drive, or in some cases, storing the graph in memory may include storing the relationship graph in volatile memory, for instance, in dynamic random access memory, within an address space of an operating system of a computing device performing the process of FIG. 1.

Some embodiments may prune the relationship graph, as indicated by block 22. In some embodiments, pruning the relationship graph may include determining which values of an adjacency matrix satisfy a threshold, for instance, are greater than a threshold value indicating a relatively strong relationship, and setting those values of the adjacency matrix that satisfy the threshold equal to one and those that do not equal to zero. In some cases, this is expected to yield a relatively sparse adjacency matrix, which may be amenable to some of the compression and expedited data processing techniques described below with reference to other sparse matrix and sparse vector operations.

Some embodiments may cluster the relationship graph, as indicated by block 24. In some cases, the pruned relationship graph may be clustered, or some embodiments may cluster the relationship graph and then prune links between clusters based on whether aggregate measures of relationships between clusters satisfy a threshold.

Next, some embodiments may send instructions to display a graphical representation of the relationship graph, as indicated by block 26. In some embodiments, the instructions may be similar those described below with reference to FIG. 2. In some embodiments, the instructions may include instructions to display a force directed layout of the relationship graph. In some embodiments, the instructions may be instructions to display graphical representation of the pruned, clustered relationship graph, for instance, in a force directed layout.

In some embodiments, visual elements of the graphical representation may be visually associated with topics related to those aspects, such as some of the above-noted topics or n-grams pertaining to the topics. For example, in some embodiments, clusters of the relationship graph may be sent with data associated with clusters with dominant topics of the cluster. Dominic topics may be determined based on a sum of predictive values of topics of keywords of documents in the respective clusters, in some cases. In some embodiments, the sums may be ranked, and a topic having a top ranking some may be selected for each cluster. Similar techniques may be used to associate documents with topics, and instructions may be sent to display those topics, for instance, in response to certain user interface events, like an event handler detecting an on-touch, touch-release, hover, mouse-over, on-click, click-release, or other event by which a user selects an aspect of the graphical user interface, like a graphical user interface element corresponding to a cluster, a document, a link between clusters, or a link between documents. In some cases, the display topics may be selected by the user to indicate that the topic should be suppressed or enhanced, and embodiments may receive the selection in step 16. Some embodiments may display the topics in a distinct menu along side the representation of the graph, e.g., in a user-selectable ranking.

Some embodiments may suggest a subset of the topics, for instance, by a sending a ranking of topics above some threshold rank, for user selection. In some cases, the topics may be ranked based on the relevance of the topics to certain transformations of the corpus of documents at issue. Some embodiments may rank topics by their coverage, for instance, their coverage over the entire corpus, their coverage over a cluster of documents, or over a particular document, depending upon the context, for example, depending upon whether the user has selected one of these aspects. In some cases, coverage may be determined based on an amount of documents having greater than a threshold pertinence of the topic to the document. Pertinence of topics to documents may be determined based on a sum or a measure of central tendency of topic-specific scores of n-grams appearing in the respective documents. In some cases, coverage may be a sum of these pertinence values across the corpus or other collection of documents. In another example, topics may be ranked based on an amount or type of n-grams predictive of the topic. In another example, topics may be ranked by an amount by which the topic, when applied in an enhancing or suppressing operation, yields a relationship graph that approaches a free scale network, or some embodiments may rank topics by a modularity of the resulting graphs when an enhancing or suppressing operation is applied. In some cases, using these measures, different rankings may be applied, one for enhancing and one for suppressing. In some embodiments, different rankings may be applied and suggested for increasing or decreasing an amount of clusters or a particular cluster selected by the user.

Some embodiments may label documents according to the topics exhibited by those documents, as indicated by the corresponding topic vector and document feature vector. Similarly, some embodiments may label clusters of documents according to topics exhibited by documents in those clusters, using similar techniques. Examples include the above describe technique for determining pertinence of topics to documents.

Figure 2:
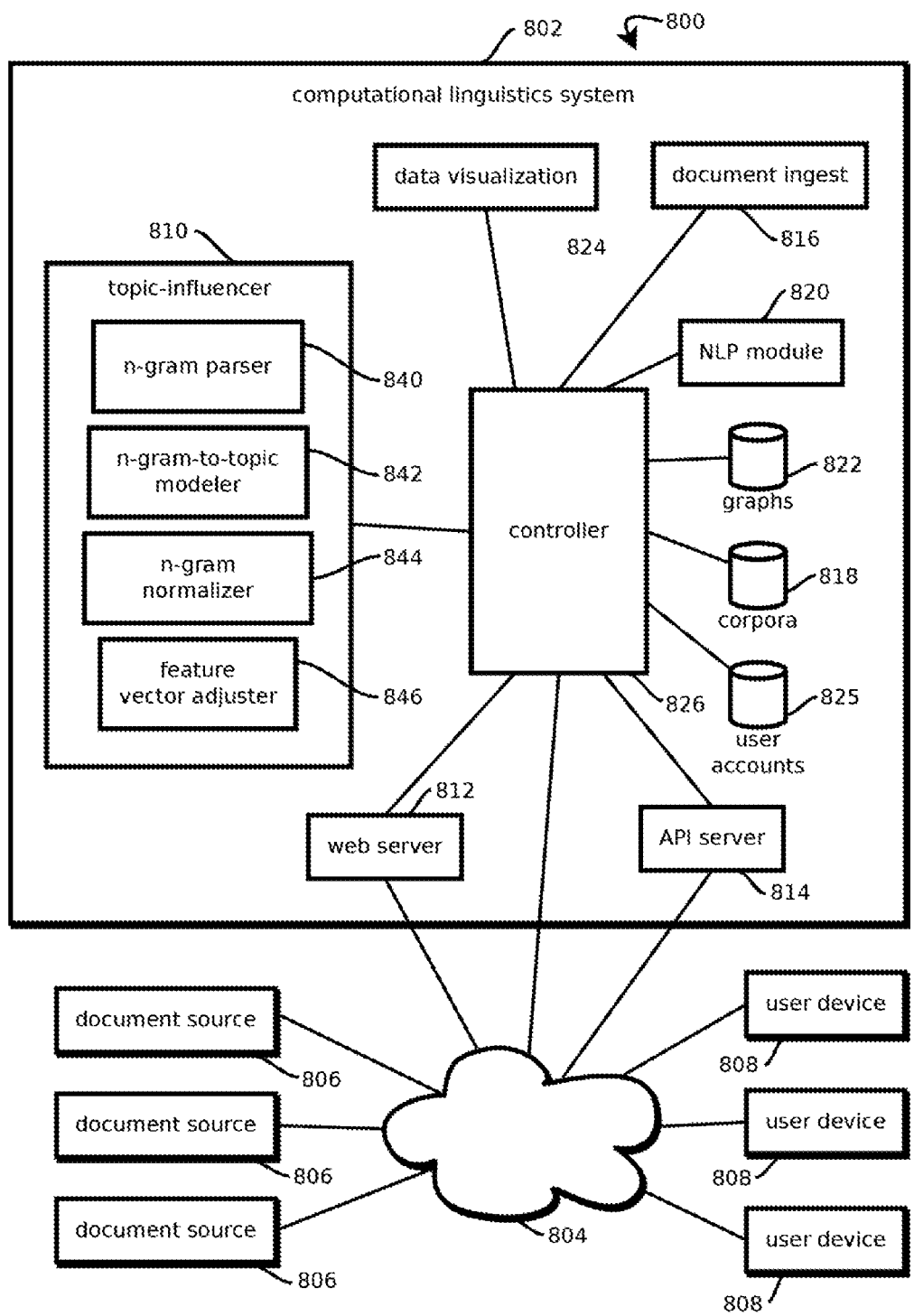
FIG. 2 is a system that may implement the process of FIG. 1.

FIG. 2 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a topic influencer 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the topic influencer 810 performs steps 14-16 and participates in step 18 of FIG. 1, along with the NLP module 820. The module 810, in some embodiments, includes n-gram parser 840, an n-gram-to-topic modeler 842, an n-gram normalizer 844, and a feature-vector adjuster 846. In some embodiments, the parser 840 determines a list of unique n-grams in a set of documents from which topics are to be identified, in some cases defining the sequence of dimensions of a tuple encoding the topic vectors. In some embodiments, the modeler 842 infers topics and related data by executing the above described supervised or unsupervised learning techniques. In some embodiments, the n-gram normalizer 844 normalizes n-gram topic-specific scores across topics, and the feature-vector adjuster 846 combines topic vectors with document feature vectors based on user (or another processes') instructions to suppress or enhance topics, using the techniques described above.

Alternatively to additionally to n-grams, embodiments may use a variety of techniques for text partitioning, such as techniques for finding patterns in text that do not account for tokens' adjacency. Thus, notwithstanding use of the term "n-gram," other token combinations are contemplated as ultimate unit for topic extraction and text analysis. The exemplary n-gram-based models may be thought as an example, but other models, including different machine learning techniques (such as deep learning), as well as different sentence parsing methodologies (including the sentence parse tree or a proximity measure for co-occurrence), may be applied in various embodiments consistent with the techniques described herein.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity web sites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpora of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-grams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 3:
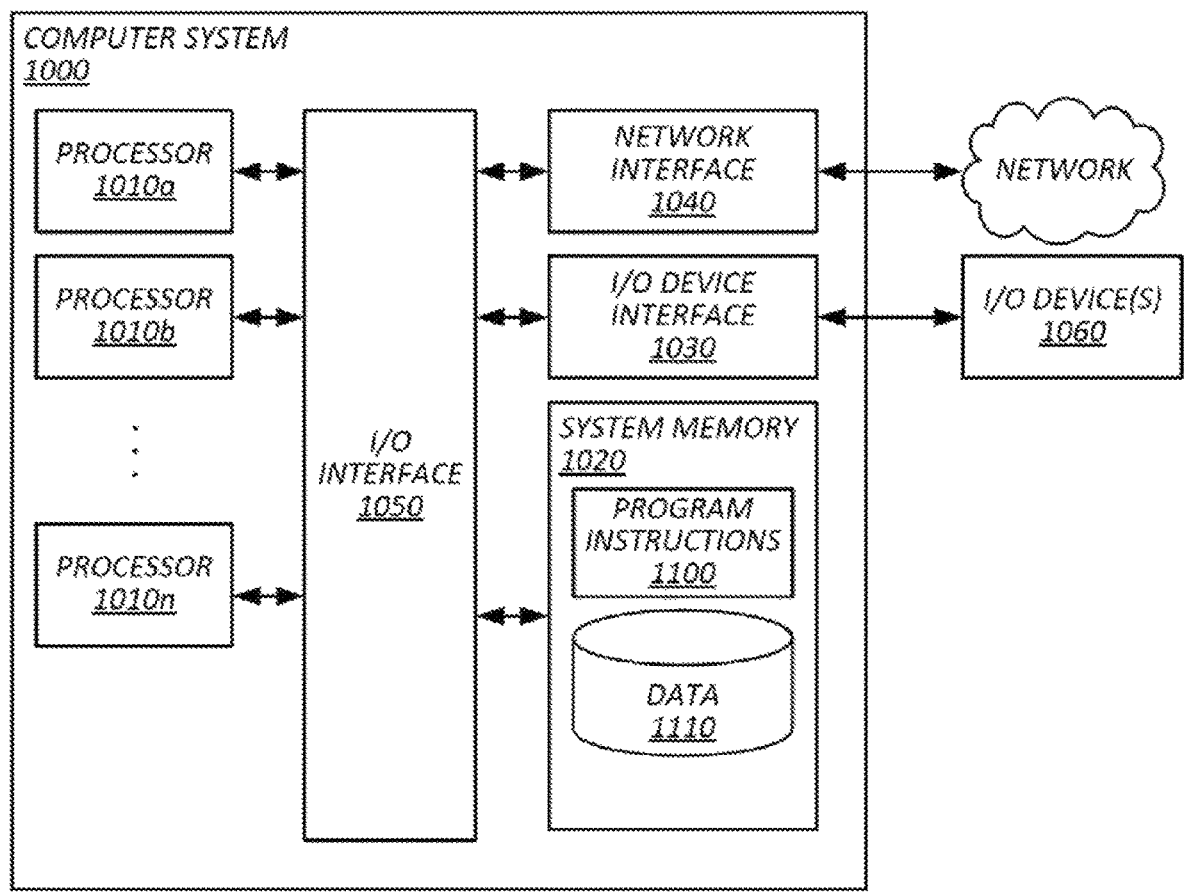
FIG. 3 is an example of a computer system by which the above techniques may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of enhancing or suppressing measures of relationships between documents based on the relationships arising from text pertaining to selected topics, the method comprising: obtaining, with one or more processors, a corpus of more than 500 documents, each document having unstructured natural language text; obtaining, with one or more processors, a set of topics and, for each topic in the set, a respective set of n-grams pertaining to the respective topic; receiving, with one or more processors, a selected topic among the set of topics, the selection indicating that relationships between the documents are to be enhanced or suppressed in virtue of the relationships arising from text relating to the selected topic; forming, with one or more processors, a relationship graph of the documents, the relationship graph having more than 500 nodes, each node corresponding to at least one document, the graph having edges between nodes indicating a relationship between documents corresponding to the respective nodes, wherein: the relationships between pairs of the documents are determined based on co-occurrence of n-grams in the pairs of the documents, and wherein the relationships are enhanced or suppressed in response to co-occurring n-grams being in the respective set of n-grams of the selected topic; and storing the relationship graph in memory.

2. The method of embodiment 1, wherein: obtaining a corpus of more than 500 documents comprises obtaining a corpus of more than 5,000 documents, each document having, on average, more than 200 words; obtaining a set of topics comprises constructing a topic model matrix mapping n-grams to topics with a score indicating a pertinence of respective n-grams to respective topics by selecting initial parameters of the topic model and iteratively adjusting the parameters to reduce an error amount of the topic model; and forming the relationship graph comprises forming a semantic similarity graph by performing operations comprising: forming a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic and, when the given n-gram pertains to the selected topic, a cardinal score indicating an amount that the given n-gram pertains to the selected topic, wherein forming the relationship graph is performed either before receiving the selected topic or within two minutes of receiving the selected topic; determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the respective values, the values corresponding to edge weights between nodes of the semantic similarity graph; pruning the semantic similarity graph by removing edges that do not satisfy a threshold weight; clustering the semantic similarity graph according to edge weights; and sending instructions to display a graphical representation of a force directed layout of the clustered semantic similarity graph to a client computing device from which the selected topic is received, the graphical representation including an indication of correspondence between at least some of the topics and aspects of the graph.

3. The method of any of embodiments 1-2, wherein obtaining the set of topics comprises: obtaining a labeled training set of documents, the labeled training set of documents being the same, overlapping, or different from the corpus, the labeled training set of documents including unstructured text labeled with respective topics to which the respective text pertains; obtaining n-grams occurring in the set of documents; determining the sets of n-grams pertaining to the respective topics by performing operations comprising: designating n-grams occurring in the set of documents as pertaining to topics with respective topic-specific scores; and iteratively determining an amount of agreement or disagreement between the topic-specific scores and the labels in the training set and adjusting the topic-specific scores in response to increase the amount of agreement or decrease the amount of disagreement.

4. The method of any of embodiments 1-3, wherein obtaining the set of topics comprises: determining parameters of a support vector machine based on the labeled training set of documents.

5. The method of any of embodiments 1-4, wherein obtaining the set of topics comprises: obtaining the set of topics by determining parameters of a Bayesian topic model based on the labeled training set of documents.

6. The method of any of embodiments 1-5, wherein obtaining the set of topics comprises: obtaining a number of topics to be learned; after obtaining the number of topics to be learned, training an unsupervised learning model to score n-grams in a set of documents with at least a score for each of the number of topics to be learned.

7. The method of any of embodiments 1-6, wherein obtaining the set of topics comprises: obtaining a number of topics to be learned; obtaining a n-grams from a training set of documents, the training set of documents being the same, overlapping, or different from the corpus; scoring n-grams as pertaining to the same respective topic among the topics to be learned based on both: a conditional probability of the respective topic being exhibited given a respective document in the training set of documents; and a conditional probability of the respective n-gram occurring given that the respective topic is exhibited.

8. The method of any of embodiments 1-7, wherein obtaining the set of topics comprises performing steps for unsupervised learning of the topics.

9. The method of any of embodiments 1-8, wherein obtaining the respective sets of n-grams pertaining to the respective topics comprises: obtaining an n-gram-topic matrix comprising: a first dimension corresponding to topics; a second dimension corresponding to n-grams; and values corresponding to an amount that a corresponding n-gram predicts a corresponding topic.

10. The method of embodiment 9, wherein the values are based on both an amount that the corresponding n-gram predicts the corresponding topic and an amount that the corresponding n-gram predicts each of at least a plurality of the other topics.

11. The method of any of embodiments 1-10, comprising: before receiving the selected topic among the set of topics, pre-calculating and storing in memory a plurality of relationship graphs corresponding to respective selections of each of at least a plurality of topics in the set of topics.

12. The method of embodiment 11, wherein: receiving a selected topic among the set of topics comprises receiving a selection of a first topic and a second topic; and forming the relationship graph of the documents comprises: retrieving from memory a first pre-calculated relationship graph corresponding to the first topic; retrieving from memory a second pre-calculated relationship graph corresponding to the second topic; and forming the relationship graph based on both the first pre-calculated relationship graph and the second pre-calculated relationship graph.

13. The method of any of embodiments 1-12, wherein forming the relationship graph comprises performing steps for adjusting feature vectors of documents based on the set of n-grams pertaining to the selected topic.

14. The method of any of embodiments 1-13, comprising: before receiving the selected topic, determining suggested topics from among the set of topics and sending the suggested topics to a remote computing device from which the selected topic is received.

15. The method of embodiment 14, wherein determining suggested topics comprises steps for suggesting topics.

16. The method of any of embodiments 1-15, wherein forming the relationship graph comprises forming a semantic similarity graph by performing operations comprising: determining a feature vector for each document, each feature vector having plurality of scores, each score corresponding to a given n-gram and being based on: an amount of occurrences of the given n-gram in the respective document, a length of the respective document, an amount of occurrences of the given n-gram in a plurality of other documents different from the respective document, and whether the given n-gram is among the set of n-grams pertaining to the selected topic; and determining an adjacency matrix based on the feature vectors, wherein rows and columns of the adjacency matrix correspond to the documents, values of the feature matrix correspond to a selected-topic-adjusted semantic similarity of documents corresponding to the respective row and column of the values, and values of the feature matrix are based on angles between feature vectors of the documents corresponding to the respective row and column of the values.

17. The method of embodiment 16, wherein determining a feature vector comprises determining the feature vector scores by determining an amount of occurrences of the given n-gram in the respective document based on a function having a derivative that decreases in magnitude as the amount of occurrences of the given n-gram in the respective document increases.

18. The method of any of embodiments 1-17, comprising: clustering the relationship graph; and sending a computing device from which the selected topic is received instructions to display a graphical representation of the clustered relationship graph.

19. The method of any of embodiments 1-18, comprising steps for reducing movement of data across a memory hierarchy.

20. A tangible, non-transitory, machine-readable medium storing instructions that when executed by a data processing apparatus cause the data processing apparatus to perform operations comprising: the operations of any of embodiments 1-19.

20. A system, comprising: one or more processors; an memory storing instructions that when executed by the processors cause the processors to effectuate operations comprising: the operations of any of embodiments 1-19.

What is claimed is:

1. A tangible, non-transitory, machine-readable medium storing instructions that when executed by one or more processors effectuate operations comprising:
obtaining, with one or more processors, a topic vector for a given topic, wherein:
the given topic appears in a corpus of natural language text among a plurality of other topics,
the topic vector includes a plurality of topic-specific scores for respective n-grams,
the topic-specific scores are indicative of respective n-grams being associated with the given topic in natural language text, and
at least some of the respective n-grams of the topic vector appear in the corpus;
inferring, with one or more processors, a plurality of relationships from the corpus of natural language text at least in part by performing a computational linguistic analysis of the natural language text based on the topic vector,
wherein, for a given n-gram having a given topic-specific score in the topic vector, and a given relationship among the plurality of relationships based on the given n-gram, the given relationship is suppressed or enhanced based on the given topic-specific score relative to a computational linguistic analysis of the natural language text that is not based on the topic vector by adjusting a contribution of a co-occurrence of the given n-gram in a pair of documents to a semantic similarity relationship between the pair of documents; and
storing, with one or more processors, the plurality of relationships in memory.

2. The medium of claim 1, wherein obtaining a topic vector comprises:
obtaining a topic model that includes a mapping of each of a plurality of topics to a set of n-grams, each n-gram in the set having, for each topic, a topic-specific score indicating a conditional probability of the respective topic being exhibited upon observing the respective n-gram in a document.

3. The medium of claim 1, wherein obtaining a topic vector comprises:
inferring, with supervised machine learning, the topic vector from a labeled set of documents, the labeled set of documents being the same, overlapping, or otherwise different from the corpus.

4. The medium of claim 3, wherein obtaining a topic vector comprises:
inferring, from the labeled set documents, the topic vector with steps for learning topic-specific scores based on a training set.

5. The medium of claim 3, wherein, for at least one document of the labeled set of documents, the at least one document contains multiple topics, and the at least one document is associated with a plurality of labels that each indicate a respective range of text in the document associated with both a respective identifier of a respective topic and a respective score indicating a pertinence of the respective topic to the respective range of text.

6. The medium of claim 1, wherein obtaining a topic vector comprises:
obtaining a training set of documents;
designating n-grams in the training set of documents as pertaining to topics;
iteratively adjusting the designations to make n-grams that, within the training set of documents, tend to co-occur in a document more likely to be designated with the same topic.

7. The medium of claim 1, wherein obtaining a topic vector comprises:
obtaining a training set of documents;
for each document in the training set, for each n-gram in each respective document of the training set:

for each topic of a plurality of topics, determining:
an amount of n-grams in the respective document designated as pertaining to the respective topic; and
an amount of all instances of n-grams of a specified size in all of the documents of the training set designated as pertaining to the respective topic;
for the respective document and n-gram in the training set, designating the respective n-gram as pertaining to a topic selected according to probabilities of the topics based on the determined amounts.

8. The medium of claim 7, wherein:
the amount of n-grams in the respective document designated as pertaining to the respective topic is a proportion relative to a total number of n-grams of the same length as the respective n-gram in the respective document;
the amount of all instances of n-grams in all of the documents of the training set designated as pertaining to the respective topic is a proportion relative to all documents in the training set; and
the specified size is a same size as a length in words of the respective n-gram.

9. The medium of claim 7, wherein probabilities of the topics based on the determined amounts are based on a conditional probability of a respective topic being exhibited given a respective document multiplied by a conditional probability of the respective n-gram occurring given that the respective topic is exhibited.

10. The medium of claim 1, wherein the plurality of relationships are of at least one of the following types of relationships:
semantic similarity of documents;
similarity of sentiments expressed in documents;
similarity of terminology in documents; or
relatedness of entities mentioned in documents.

11. The medium of claim 1, comprising:
forming a graph in which the inferred relationships serve as edges of the graph.

12. The medium of claim 11, wherein nodes of the graph correspond to:
documents of the corpus;
paragraphs of the corpus;
entities mentioned in the corpus; or
terminology in the corpus.

13. The medium of claim 1 wherein the topic vector is obtained, at least in part, by:
obtaining an indication of time in which relationships between the given topic and n-grams are to be applied;
selecting the given topic vector from among a plurality of topic vectors pertaining to the given topic, the plurality of topic vectors corresponding to different durations of time and characterizing n-gram associations with the given topic during the different durations of time.

14. The medium of claim 1, wherein:
the given relationship is enhanced based on the topic-specific score by an amount specified at least in part specified by a user.

15. The medium of claim 14, comprising:
obtaining a different topic vector pertaining to a different topic from the given topic;
wherein the given relationship is enhanced based on another topic-specific score for the given n-gram from the different topic vector.

16. The medium of claim 14, wherein:
the given relationship is enhanced based on the other topic-specific score by another amount specified at least in part by the user, the amount and the other amount being different amounts indicated by user input.

17. The medium of claim 1, wherein performing computational linguistic analysis of the natural language text based on the topic vector comprises:
inferring relationships based on distributional semantic analysis in which pertinence of n-grams to the given topic indicated in the topic vector modulate effects of the respective n-grams on a result of the distributional semantic analysis.

18. The medium of claim 1, wherein performing computational linguistic analysis of the natural language text based on the topic vector comprises:
steps for forming a semantic similarity graph.

19. The medium of claim 1 comprises
sending instructions to a client computing device to display a graphical representation of at least some of the relationships.

20. A method, comprising:
obtaining, with one or more processors, a topic vector for a given topic, wherein:
the given topic appears in a corpus of natural language text among a plurality of other topics,
the topic vector includes a plurality of topic-specific scores for respective n-grams,
the topic-specific scores are indicative of respective n-grams being associated with the given topic in natural language text, and
at least some of the respective n-grams of the topic vector appear in the corpus;
inferring, with one or more processors, a plurality of relationships from the corpus of natural language text at least in part by performing a computational linguistic analysis of the natural language text based on the topic vector,
wherein, for a given n-gram having a given topic-specific score in the topic vector, and a given relationship among the plurality of relationships based on the given n-gram, the given relationship is suppressed or enhanced based on the given topic-specific score relative to a computational linguistic analysis of the natural language text that is not based on the topic vector by adjusting a contribution of a co-occurrence of the given n-gram in a pair of documents to a semantic similarity relationship between the pair of documents; and
storing, with one or more processors, the plurality of relationships in memory.

21. The method of claim 20, wherein obtaining a topic vector comprises:
obtaining a topic model that includes a mapping of each of a plurality of topics to a set of n-grams, each n-gram in the set having, for each topic, a topic-specific score indicating a conditional probability of the respective topic being exhibited upon observing the respective n-gram in a document.

22. The method of claim 20, wherein obtaining a topic vector comprises:
inferring, with supervised machine learning, the topic vector from a labeled set of documents, the labeled set of documents being the same, overlapping, or otherwise different from the corpus.

23. The method of claim 22, wherein obtaining a topic vector comprises:
inferring, from the labeled set documents, the topic vector with steps for learning topic-specific scores based on a training set.

24. The method of claim 22, wherein, for at least one document of the labeled set of documents, the at least one document contains multiple topics, and the at least one document is associated with a plurality of labels that each indicate a respective range of text in the document associated with both a respective identifier of a respective topic and a respective score indicating a pertinence of the respective topic to the respective range of text.

25. The method of claim 20, wherein obtaining a topic vector comprises:
obtaining a training set of documents;
designating n-grams in the training set of documents as pertaining to topics;
iteratively adjusting the designations to make n-grams that, within the training set of documents, tend to co-occur in a document more likely to be designated with the same topic.

26. The method of claim 20, wherein obtaining a topic vector comprises:
obtaining a training set of documents;
for each document in the training set, for each n-gram in each respective document of the training set:
for each topic of a plurality of topics, determining:
an amount of n-grams in the respective document designated as pertaining to the respective topic; and
an amount of all instances of n-grams of a specified size in all of the documents of the training set designated as pertaining to the respective topic;
for the respective document and n-gram in the training set, designating the respective n-gram as pertaining to a topic selected according to probabilities of the topics based on the determined amounts.

27. The method of claim 26, wherein:
the amount of n-grams in the respective document designated as pertaining to the respective topic is a proportion relative to a total number of n-grams of the same length as the respective n-gram in the respective document;
the amount of all instances of n-grams in all of the documents of the training set designated as pertaining to the respective topic is a proportion relative to all documents in the training set; and
the specified size is a same size as a length in words of the respective n-gram.

28. The method of claim 26, wherein probabilities of the topics based on the determined amounts are based on a conditional probability of a respective topic being exhibited given a respective document multiplied by a conditional probability of the respective n-gram occurring given that the respective topic is exhibited.

29. The method of claim 20, wherein the plurality of relationships are of at least one of the following types of relationships:
semantic similarity of documents;
similarity of sentiments expressed in documents;
similarity of terminology in documents; or
relatedness of entities mentioned in documents.

30. The method of claim 20, comprising:
forming a graph in which the inferred relationships serve as edges of the graph.

31. The method of claim 30, wherein nodes of the graph correspond to:
documents of the corpus;
paragraphs of the corpus;
entities mentioned in the corpus; or
terminology in the corpus.

32. The method of claim 20 wherein the topic vector is obtained, at least in part, by:
obtaining an indication of time in which relationships between the given topic and n-grams are to be applied;
selecting the given topic vector from among a plurality of topic vectors pertaining to the given topic, the plurality of topic vectors corresponding to different durations of time and characterizing n-gram associations with the given topic during the different durations of time.

33. The method of claim 20, wherein:
the given relationship is enhanced based on the topic-specific score by an amount specified at least in part specified by a user.

34. The method of claim 33, comprising:
obtaining a different topic vector pertaining to a different topic from the given topic;
wherein the given relationship is enhanced based on another topic-specific score for the given n-gram from the different topic vector.

35. The method of claim 33, wherein:
the given relationship is enhanced based on the other topic-specific score by another amount specified at least in part by the user, the amount and the other amount being different amounts indicated by user input.

36. The method of claim 20, wherein performing computational linguistic analysis of the natural language text based on the topic vector comprises:
inferring relationships based on distributional semantic analysis in which pertinence of n-grams to the given topic indicated in the topic vector modulate effects of the respective n-grams on a result of the distributional semantic analysis.

37. The method of claim 20, wherein performing computational linguistic analysis of the natural language text based on the topic vector comprises:
steps for forming a semantic similarity graph.

38. The method of claim 20 comprises
sending instructions to a client computing device to display a graphical representation of at least some of the relationships.

* * * * *